(12) United States Patent
Mano

(10) Patent No.: US 9,896,171 B2
(45) Date of Patent: Feb. 20, 2018

(54) SHOE BINDING SYSTEM FOR A ROWING BOAT

(71) Applicant: Thierry Mano, Avignon (FR)

(72) Inventor: Thierry Mano, Avignon (FR)

( * ) Notice: Subject to any disclaimer, the term of this patent is extended or adjusted under 35 U.S.C. 154(b) by 0 days.

(21) Appl. No.: 15/104,124

(22) PCT Filed: Dec. 15, 2014

(86) PCT No.: PCT/FR2014/053328
§ 371 (c)(1),
(2) Date: Jun. 13, 2016

(87) PCT Pub. No.: WO2015/092240
PCT Pub. Date: Jun. 25, 2015

(65) Prior Publication Data
US 2016/0347434 A1    Dec. 1, 2016

(30) Foreign Application Priority Data

Dec. 20, 2013 (FR) ..................................... 13 63178

(51) Int. Cl.
*B63H 16/02* (2006.01)
*A63C 9/086* (2012.01)
*B62M 3/08* (2006.01)

(52) U.S. Cl.
CPC .............. *B63H 16/02* (2013.01); *A63C 9/086* (2013.01); *B62M 3/086* (2013.01)

(58) Field of Classification Search
CPC .......... B63H 16/02; B62M 3/086; A43B 5/14; A43B 5/08
See application file for complete search history.

(56) References Cited

U.S. PATENT DOCUMENTS

| 4,819,504 A * | 4/1989 | Sampson | B62M 3/086 74/594.4 |
| 4,922,786 A * | 5/1990 | Romano | B62M 3/086 74/594.4 |
| 8,015,936 B2 * | 9/2011 | Sakaue | B63H 16/02 114/363 |
| 8,051,794 B2 * | 11/2011 | Matsueda | A43B 5/08 114/363 |
| 2006/0183385 A1 * | 8/2006 | Kaufer | B63H 16/02 440/21 |
| 2009/0241827 A1 | 10/2009 | Matsueda et al. | |

OTHER PUBLICATIONS

Search Report dated 2014.

* cited by examiner

*Primary Examiner* — Andrew Polay
(74) *Attorney, Agent, or Firm* — Ipsilon USA, LLP

(57) ABSTRACT

The invention relates to a system (1) for binding a shoe (2) to a foot rest (3) of a rowing boat, said shoe (2) having a sole (21) and said foot rest (3) being likeable to a plate having an underside (9) and a top surface (8). The main feature of a binding system according to the invention is that it comprises at least one mobile stop (6) projecting from the top surface (8) and a rigid actuating lever (4) projecting from the underside (9), and in that said lever (4) is connected to said at least one stop (6) in such a way that movement of said lever (4) causes said at least one stop (6) to move between a deployed position in which it becomes lodged in a recess (22) in the sole (21), and a retracted position in which it leaves said recess (22) and allows the shoe (2) to be detached from the foot rest (3).

9 Claims, 3 Drawing Sheets

SHOE BINDING SYSTEM FOR A ROWING BOAT

RELATED APPLICATIONS

This application is a National Phase Application of PCT/FR2014/053328 filed on Dec. 15, 2014, which in turn claims the benefit of priority from French Patent Application No. 13 63178 filed on Dec. 20, 2013, the entirety of which are incorporated herein by reference.

BACKGROUND

Field of the Invention

The invention relates to a shoe binding system, for a rowing boat. Generally, an individual rowing in a boat sits on a seat which is free to move in translation along a longitudinal axis of this boat. The individual wears shoes which are bound to a footplate, such that the individual's feet cannot slip on said footplate while engaged in this activity. More specifically, the invention relates to an improved system for binding a shoe to a footplate of a rowing boat.

Description of Related Art

Systems for binding a shoe to a footplate of a rowing boat exist and have already been the subject of patents. Mentim may be made, for example, of the patent application US2012/0234226, which relates to such a binding system and which has the particular quality of being able to adjust the lateral movements of the shoe on the footplate of the rowing boat. However, although this binding system performs well in terms of connecting the shoe to the footplate, it nonetheless has a low level of security.

OBJECTS AND SUMMARY

Indeed, in an ideal situation, a system for binding a shoe to a footplate of a rowing boat must have two essential features:
ensuring secure binding of the shoe to the footplate so as to avoid the shoe detaching easily from said footplate as soon as the rower exerts the slightest pressure with their foot,
allowing the shoe to detach instantaneously and easily from said footplate in the event of the rowing boat accidentally capsizing, so as to allow an individual to easily extricate themself from said boat.

The binding systems according to the invention are configured so as to have these two features.

The invention relates to a system for binding a shoe to a footplate of a rowing boat, said shoe having a sole and said footplate being comparable to a plate having a lower face and an upper face.

The principal feature of a binding system according to the invention is that it comprises at least one mobile stop projecting from the upper face and a rigid actuating lever projecting from the lower face, said lever being connected to said at least one stop in such a way that the movement of said lever causes said at least one stop to move between a deployed position, in which it is received in a recess in the sole, and a retracted position, in which it allows the shoe to detach from the footplate. Thus, the insertion of at least one stop into the recess of the shoe allows said shoe to be securely anchored in the footplate in order to avoid any untimely sliding of said shoe on said footplate during rowing. Such a system also has a high level of security by virtue of the presence of the lever, the movement of which permits immediate retraction of each stop in order to simultaneously free the shoe. Thus, in the event of the boat accidentally capsizing, a person can instantly extricate themself therefrom in order to rapidly return to the surface and avoid dangerous situations. It is assumed that each stop consists of a solid part whose shape and size match the features of the recess. It is assumed that the actuating lever is connected mechanically to each stop such that it is the movement of the lever which directly imparts the movement of each stop. Conventionally, the footplate is a plate positioned inclined in the rowing boat. The concepts of "upper face" and "lower face" are to be considered as though the footplate has been mounted on the boat. The recess created in the sole of the shoe presents no obstacle to a person being able to walk with said shoes. With a binding system according to the invention, a person may row with their own shoes. The term "sole" refers, schematically, to a thickness of material located in a lower region of the shoe. This sole may either directly form part of the shoe or be added to a usual sports shoe.

Advantageously, the binding system according to the invention comprises a post projecting from the upper face of the footplate and supporting each stop, said post being designed to be received in the recess of the shoe, and each stop being able to pass from a deployed position, in which it emerges from said post, to a retracted position, in which it is inside said post. In other words, the post serves as a guide element, making it possible to pre-position the shoe on the footplate by making said post line up with the recess in the sole. As long as the stops are retracted in the post, a person is always able to remove their shoe from the footplate. When said stops emerge from the post, said person is no longer able to remove their shoe from said footplate without actuating the lever. It is assumed that the dimensions of the assembly consisting of the post and the stops in the deployed position are greater than the dimensions of the recess. The shape of the post must match that of the recess in order to ensure that said post is received in said recess in a stable and optimized fashion.

Preferably, the binding system according to the invention comprises four stops distributed regularly about the post, two successive stops being at 90° from one another. The presence of four stops means that the shoe is evenly secured to the footplate. More precisely, two successive stops are borne on two perpendicular axes passing through the center of the post.

Preferably, the post is cylindrical and projects from the upper face such that its axis of revolution is perpendicular to said face, each stop emerging from the lateral surface of said post when it is in a deployed position. Advantageously, for this configuration, each stop moves in translation along a radial direction of the post so as to pass from a deployed position to a retracted position, and vice versa. Since the post is cylindrical, it is implicitly assumed that it has a lateral surface.

Advantageously, the recess of the sole has an annular channel widening said recess in said sole, each stop being received at the back of said channel when it is in a deployed position. Thus, once each stop is deployed within the channel, it acts as a member immobilizing the shoe in the footplate, preventing said shoe from being removed simply by sliding along the post. The annular channel makes it possible to create a free space between the post and the sole.

Advantageously, each stop is connected to the lever by means of a relay element, the lever being mounted so as to be able to move on the lower face of the footplate, movement of said lever causing, via each relay element, translation of each stop in the post so as to pass from a deployed position to a retracted position, and vice versa. In other words, the movement of the lever is transmitted directly to the stops via the intermediary of each relay element. The expression "vice versa" means that, depending on the direction of handling of the lever, the stops may pass from a deployed position to a retracted position, or from a retracted position to a deployed position.

Preferably, each relay element is a connecting wire, the lever being able to move in rotation between a first position, allowing the stops to be in a deployed position, and a second position, allowing said stops to be in a retracted position. A wire constitutes a relay element which is lightweight and which can easily transmit movement via a tensile force. Advantageously, it is assumed that the wires are sufficiently rigid to directly transmit the movement from the lever to the stops without deforming beforehand.

Preferably, the lever is configured so as to exert, by inertia, a sufficient force on the relay elements so as to hold each stop in a deployed position. Thus, when a person is seated in the rowing boat and has their shoes bound to the footplate, the lever which is placed beneath said footplate exerts, by inertia, a tension on the relay elements which make it possible to permanently hold the stops in a deployed position. This lever may be made of a heavy material, such as an appropriate metal, or it may be made of a relatively lightweight material and be weighted using a mass of heavy material.

Advantageously, accidental capsizing of the boat causes the lever to move by inertia, causing each stop to retract into the post, allowing each shoe to be freed from the footplate. In other words, when the boat capsizes, the lever is then above the footplate and therefore tends to move by inertia so as to approach said footplate. This approach causes a tensile force in the relay elements, resulting in instantaneous and systematic retraction of the stops, which immediately free the shoe from the footplate to which it was bound. Thus, in a dangerous situation, when the boat capsizes, an individual may extricate themself from the boat instantaneously without having to perform any operation or action to free their shoes. Indeed, the natural tipping movement of the lever in the event of this capsize, and brought about by inertia, causes the retraction of the retaining stops.

Advantageously, the post, the stops and the connecting wires are made of metal. In general, these elements may be made of a lightweight material having good mechanical strength, such as plastic.

The binding systems according to the invention have the advantage of having a dual functionality: on one hand ensuring secure binding of the shoe during rowing, and on the other hand ensuring a high level of security for a rower by producing instantaneous and systematic detachment of said shoe in the event of the boat capsizing. Thus, a person in difficulty in the event of such a capsize will not have to perform any particular action in order to release their shoes from the footplate, said release being brought about automatically. In addition, they have the advantage of being reliable and easy to master insofar as they are of simple design and they employ a limited number of parts. Finally, they have the advantage of being of constant mass and bulk, in comparison to the already existent binding systems which do not have this dual functionality.

BRIEF DESCRIPTION OF THE DRAWINGS

There follows a detailed description of a preferred embodiment of a binding system according to the invention, with reference to FIGS. 1 to 8.

DETAILED DESCRIPTION

Figure 1:
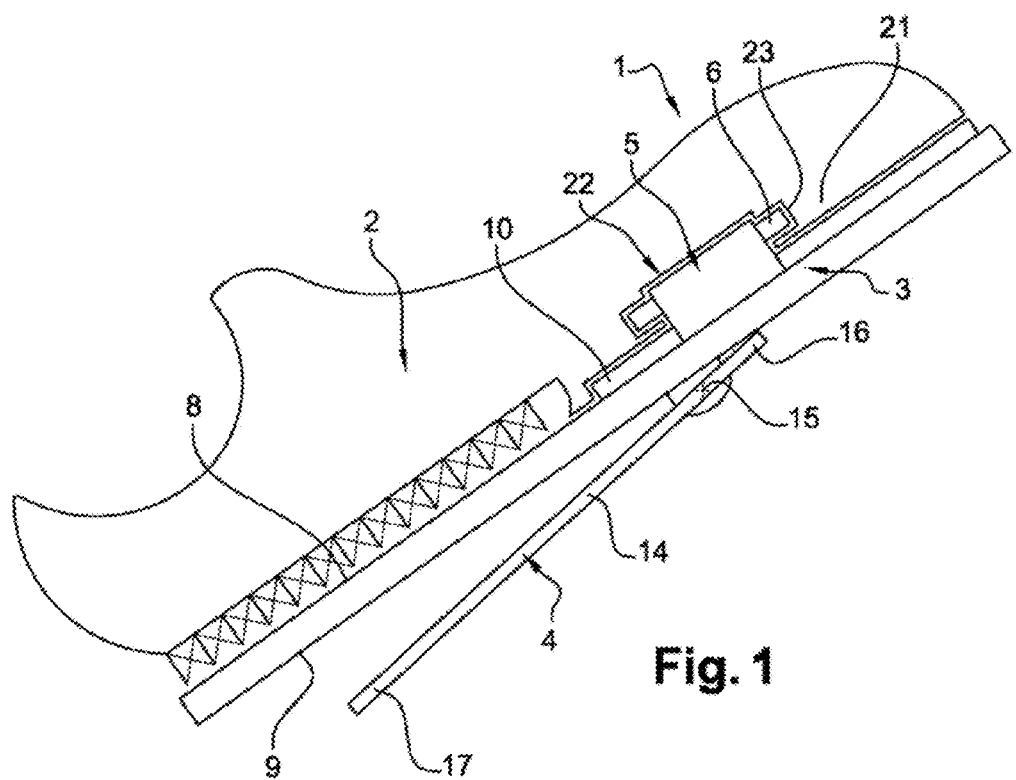
FIG. 1 is a schematic sectional view of a binding system according to the invention by means of which a shoe can be bound to a footplate of a rowing boat.

With reference to FIG. 1, a binding system 1 according to the invention makes it possible to securely bind a shoe 2 to a footplate 3 of a rowing boat. Indeed, it is important to tightly bind the shoes 2 of a rower to said footplate 3 in order to avoid these moving with each force exerted by said rower while rowing. Such a device 1 uses an actuating lever 4, a post 5 and mobile stops 6 connected to said lever 4 via the intermediary of connecting wires 7.

With reference to FIGS. 1, 6, 7 and 8, a footplate 3 for a rowing boat is represented schematically by a plate of constant thickness, having a flat upper face 8 and a flat lower face 9. Generally, this plate 3 is inclined to allow a rower to place their feet on the upper face 8 of said plate 3. The actuating lever 4 is comparable to an elongate rod 14 which is mounted in rotation about a horizontal axis 15. This axis 15 lies in a plane parallel to the lower face 9 of the footplate 3, said axis 15 emerging from said lower face 9 by being situated beneath the latter. The rod 14 has, along its longitudinal axis, a first end 16, which is designed to be connected to the connecting wires 7, and a free second end 17. The rod 14 is mounted on the axis of rotation 15 at a region close to its first end 16, and can thus pivot in a vertical plane. It is assumed that the mass of the lever 4 is substantial, such that it can exert, by inertia, a significant force on the connecting wires 7.

Figure 2:
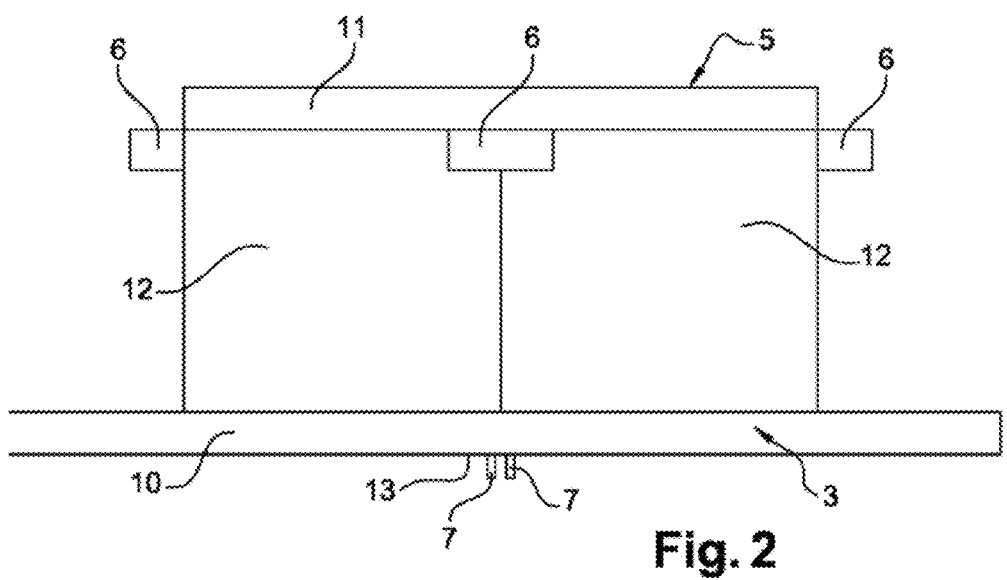
FIG. 2 is a schematic side view of a post of a binding system according to the invention, supporting four stops.
Figure 5A:
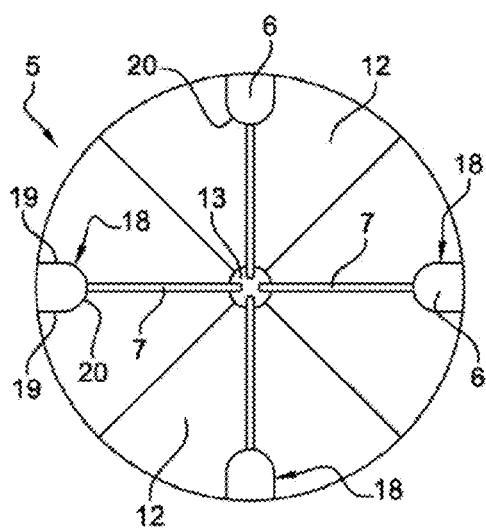
FIG. 5A is a schematic plan view of the post of FIG. 2, the four stops being in a retracted position.
Figure 5B:
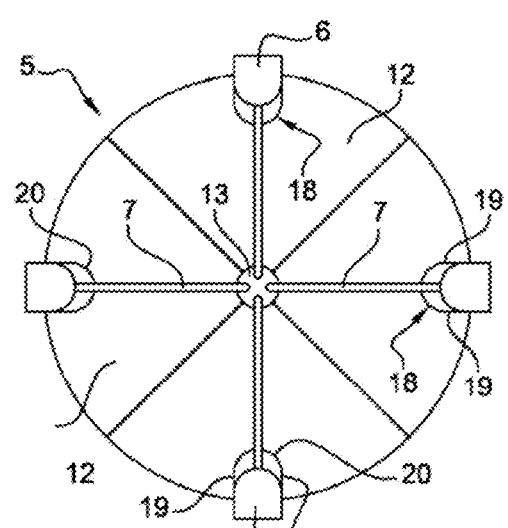
FIG. 5B is a schematic plan view of the post of FIG. 2, the four stops being in a deployed position.

With reference to FIGS. 2, 5A and 5B, the post 5 comprises a cylindrical base 10 designed to be attached to the upper face 8 of the footplate 3, four parts 12 each forming a quarter cylinder, and a cylindrical lid 11. The four parts 12 are arranged with one another so as to form a cylinder and are bounded on one side by said base 10 and on the other side by said lid 11. The lid 11, the base 10 and the cylinder made up of the four parts 12 are coaxial such that the post 5 has an axis of revolution. Said post 5 is thus brought to be placed on the upper face 8 of the footplate 3, in a position in which its axis of revolution is perpendicular to said face 8. The base 10 is provided with a central opening 13 designed to be superposed with a corresponding opening in the footplate 3. Said base is preferably screwed onto the footplate 3. Said base 10 and said lid 11 are preferably screwed onto the parts 12 of the post 5.

Figure 3:
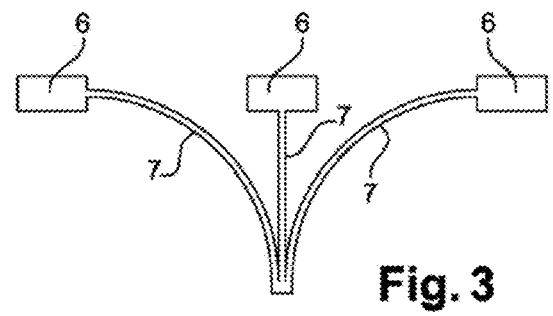
FIG. 3 is a schematic side view of the four stops and of connecting wires of a binding system according to the invention.

With reference to FIG. 3, the post 5 encloses an immobilizing/release mechanism for the shoe 2 on the footplate 3, based on four stops 6 and four connecting wires 7. Thus, each connecting wire 7 connects a stop 7 to the first end 16 of the actuating lever 4. FIG. 3 represents the positioning of the stops 6 and of the connecting wires 7 in the post 5. It is assumed that each connecting wire 7 has a certain stiffness in order to transmit the movement of the lever 4 to the four stops 6.

With reference to FIGS. 2, 4A, 4B, 5A and 5B, each part 12 of the post 5 comprises a peripheral recess 18 which opens to the outside of said part 12, said recess 18 being located on a median axis of this part 12. As shown in FIGS. 5A and 5B, the four recesses 18 are distributed evenly about the post 5, such that two consecutive recesses 18 are arranged at 90° from one another. In other words, two consecutive recesses 18 are situated on two radial and mutually perpendicular axes. Each recess 18 is of constant height, said height being its dimension parallel to the axis of revolution of the post 5, and is bounded by two radial edges 19. The back 20 of each recess 18 is curved in a circular arc. Thus, each stop 6 is placed in the recess 18 of a part 12 making up the post 5, and is connected to the first end 16 of the actuating lever 4 by a wire 7 passing through said part 12 and passing through the central opening 13 in the base 10 as well as through the corresponding opening in the footplate 3.

Figure 4A:
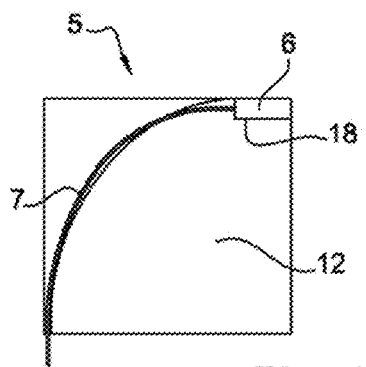
FIG. 4A is a schematic side view of one half of the post of FIG. 2, the stop being in a retracted position.
Figure 4B:
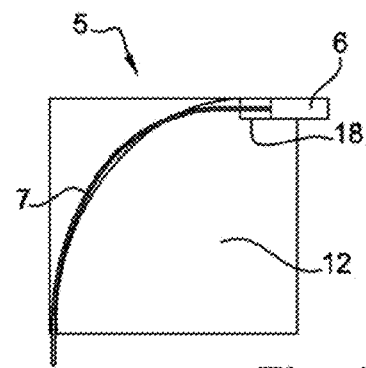
FIG. 4B is a schematic side view of the half of the post of FIG. 2, the stop being in a deployed position.

It is assumed that the first end 16 of the lever 4 is located opposite these two superposed openings 13. The connecting wire 7 thus allows each stop 6 to be moved between a retracted position inside each part 12 of the post 5, as shown in FIGS. 4A and 5A, and a deployed position, as shown in FIGS. 4B and 5B. In a deployed position, each stop 6 emerges radially from each part 12 of the post 5, contributing to a localized widening of the resulting cylinder made up of the four parts 12.

Figure 6:
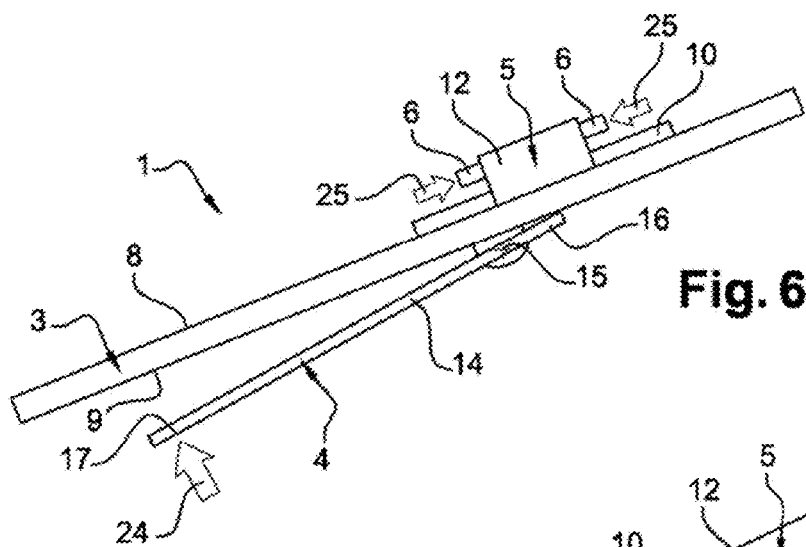
FIG. 6 is a schematic sectional view of a binding system according to the invention, in a configuration of binding of the shoe.

As shown in FIG. 6, when the binding system 1 according to the invention is mounted on a footplate 3 of a rowing boat, the actuating lever 4 hangs below said footplate 3. By virtue of its considerable mass, the second end 17 of the lever 4 naturally tends to move away from the footplate 3, simultaneously causing the first end 16 of said lever 4 to move closer to said footplate 3 since said ends 16, 17 are placed on either side of the axis of rotation 15. This greater proximity of the first end 16 causes the connecting wires 7 connected thereto to move, and thus the stops 6 to be pushed out of the post 5 in which they are placed. In a normal situation of navigation on a rowing boat, the stops 6 are thus in a deployed position around the post 5, under the action of the mass of the lever 4.

With reference to FIG. 1, each shoe 2 comprises a sole 21 having a cylindrical recess 22 whose axis of revolution is perpendicular to the plane of said sole 21. This cylindrical recess 22 is provided with an annular channel 23 widening said recess 22. The diameter of this recess 22 is greater than the diameter of the post 5 such that said post 5 can be inserted into said recess 22, the annular channel 23 forming a clearance space designed to accommodate the stops 6 in the deployed position. These shoes 2 may be designed directly with a recess 22 in the sole 21 and are, in that case, intended solely for rowing. According to another variant embodiment, an overshoe having a sole with said recess 21 can attach around a town or sports shoe in order to be able to row.

Specifically, a person who is wearing shoes 2 having a sole 21 with a recess 22 and who wishes to row in a rowing boat comprising a footplate 3 fitted with a binding system 1 according to the invention will carry out the following actions:

manually rotating the actuating lever 4, as shown by the arrow 24 in FIG. 6, in order to bring the second end 17 thereof closer to the lower face 9 of said footplate 3, this increased proximity causing, by design, the first end 16 thereof to move away from said lower face 9. This increased distance results in the stops 6 retracting inside the post 5 in the direction indicated by the two opposing arrows 25 in FIG. 6. This operation of manipulating the lever 4 makes it possible to arrive at the configuration shown in FIG. 7. Thus, as long as the actuating lever 4 is folded flat against the footplate 23, the stops are retracted inside the post 5, a step of positioning the shoes 2 on the footplate 3, causing the two posts 5 to enter the recess 22 of the sole 21 of said shoes 2, a step of releasing the lever 4 which pivots by inertia so as to return to its natural resting position below the footplate 3. Upon this release step, the second end 17 moves away from and the first end 16 moves toward the lower face 9 of the footplate 3. This increased proximity deploys the stops 6 which then project from the post 5 via the intermediary of the connecting wires 7 so as to fit into the annular channel 23 of the recess 22 of the sole 21. This release step makes it possible to arrive at the configuration shown in FIG. 1, in which the shoes 2 are securely bound to the footplate 3.

At the end of their rowing activity, the person once again pivots the lever 4 toward the footplate 3 in order to retract the stops 6 into the post 5 and allow the shoes 2 to be removed from said footplate 3.

Figure 7:
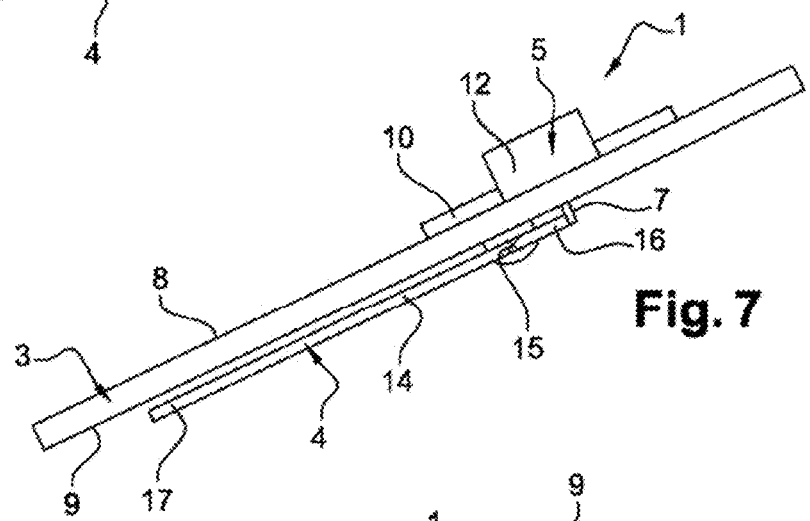
FIG. 7 is a schematic sectional view of a binding system according to the invention, in a configuration of release of the shoe.
Figure 8:
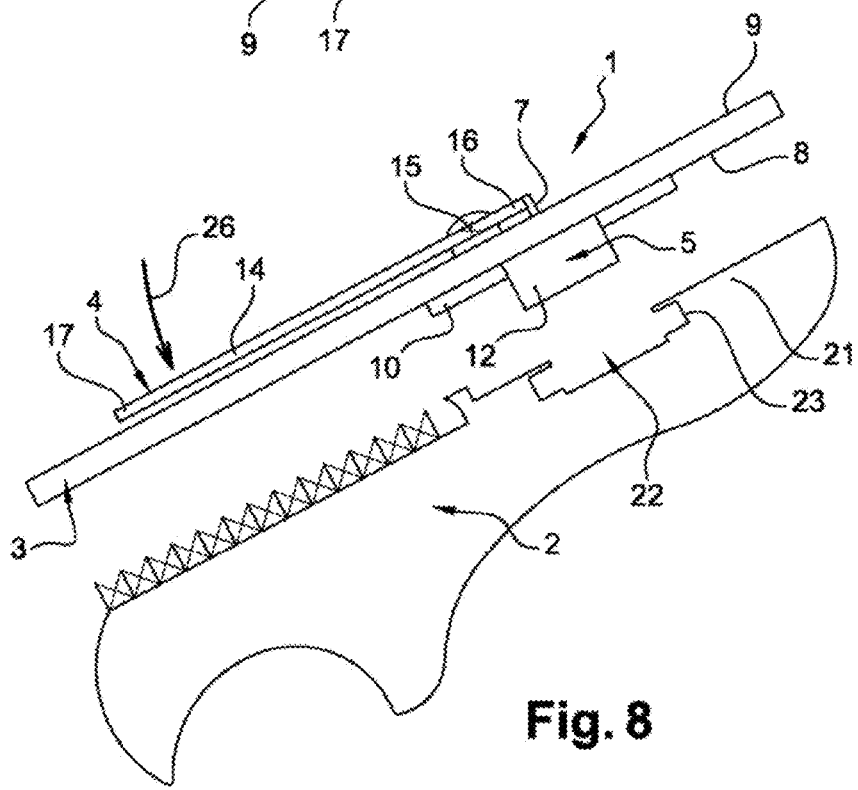
FIG. 8 is a schematic sectional view of a binding system according to the invention which has been turned through 180° in order to represent the situation of a boat fitted with said binding system capsizing.

Another major feature of a binding system according to the invention is that it has a high level of security for a rower seated in the boat. Indeed, in the event of a capsize, the boat generally rotates through 180° about its longitudinal axis, pulling said rower under the boat, with significant risks of drowning. As shown in FIG. 7, once the boat has rotated through 180° in the event of a capsize, the lever 4 is then above the footplate 3. By virtue of its weight, said lever 4 then naturally tends to pivot so as to lie against the footplate 3, as shown by the direction of the arrow 26. This pivoting is associated with the first end 16 of the lever 4 moving away from the footplate 3, causing the stops 6 to be retracted inside the post 5. The respective shoe 2 is then no longer held on the footplate 3 by said stops 6, and the rower, who is accidentally underneath the boat, can then extricate themself without difficulty from the boat, so as to rapidly return to the surface.

Thus, in the event of a capsize, the binding system according to the invention is configured such that the lever 4 can act merely under the effect of its own weight in order to free the shoes 2 from the footplate 3. In the event of a capsize, this binding system requires no intervention or action on the part of the rower for the latter to detach themself from the boat.

The invention claimed is:

1. A system for binding a shoe to a footplate of a rowing boat, said shoe having a sole and said footplate being comparable to a plate having a lower face and an upper face, said system comprising:
   at least one mobile stop projecting from the upper face; and
   a rigid actuating lever projecting from the lower face, wherein said lever being connected to said at least one stop, and configured to move said at least one stop to move between a deployed position, in which it is received in a recess in the sole, and a retracted position, in which it allows the shoe to detach from the footplate, when said lever is moved, and
   wherein said system further comprises a post projecting from the upper face of the footplate and supporting each stop, said post being designed to be received in the recess of the shoe, each stop being able to pass from a deployed position, in which it emerges from said post, to a retracted position, in which it is inside said post.

2. The binding system as claimed in claim 1, wherein said system comprises four stops distributed regularly about the post, two successive stops being at 90° from one another.

3. The binding system as claimed in claim 1, wherein the post is cylindrical and projects from the upper face such that its axis of revolution is perpendicular to said face, and in that each stop emerges from the lateral surface of said post when it is in a deployed position.

4. The binding system as claimed in claim 1, wherein the recess of the sole has an annular channel widening said recess in said sole, and in that each stop is received at the back of said channel when it is in a deployed position.

5. The binding system as claimed in claim 1, wherein each stop is connected to the lever by means of a relay element, and in that the lever is mounted so as to be able to move on the lower face of the footplate, movement of said lever causing, via each relay element, translation of each stop in the post so as to pass from a deployed position to a retracted position, and vice versa.

6. The binding system as claimed in claim 5, wherein each relay element is a connecting wire, and in that the lever is able to move in rotation between a first position, allowing the stops to be in a deployed position, and a second position, allowing said stops to be in a retracted position.

7. The binding system as claimed in claim 5, wherein the lever is configured so as to exert, by inertia, a sufficient force on the relay elements so as to hold each stop in a deployed position.

8. The binding system as claimed in claim 7, wherein accidental capsizing of the boat causes the lever to move by inertia, causing each stop to retract into the post, allowing each shoe to be freed from the footplate.

9. The binding system as claimed in claim 6, wherein the post, the stops and the connecting wires are made of metal.

* * * * *